US012447625B2

(12) United States Patent
Danko et al.

(10) Patent No.: US 12,447,625 B2
(45) Date of Patent: Oct. 21, 2025

(54) SYSTEMS AND METHODS FOR ALIGNING AND LOCALIZING A TOOL

(71) Applicants: OLIVER CRISPIN ROBOTICS LIMITED, Altrincham (GB); General Electric Company, Schenectady, NY (US)

(72) Inventors: Todd William Danko, Niskayuna, NY (US); Trevor Owen Hawke, Bristol (GB)

(73) Assignees: OLIVER CRISPIN ROBOTICS LIMITED, Altrincham (GB); General Electric Company, Schenectady, NY (US)

( * ) Notice: Subject to any disclaimer, the term of this patent is extended or adjusted under 35 U.S.C. 154(b) by 504 days.

(21) Appl. No.: 17/832,248

(22) Filed: Jun. 3, 2022

(65) Prior Publication Data
US 2023/0390933 A1    Dec. 7, 2023

(51) Int. Cl.
*G01B 11/27* (2006.01)
*B25J 9/16* (2006.01)
(Continued)

(52) U.S. Cl.
CPC ............ *B25J 9/1697* (2013.01); *B25J 13/08* (2013.01); *G01B 11/272* (2013.01); *B25J 11/0075* (2013.01); *B64F 5/40* (2017.01)

(58) Field of Classification Search
None
See application file for complete search history.

(56) References Cited

U.S. PATENT DOCUMENTS

| 4,380,696 A | 4/1983 | Masaki |
| 4,444,495 A | 4/1984 | Bramwell et al. |

(Continued)

FOREIGN PATENT DOCUMENTS

| CA | 2861376 A | 8/2013 |
| CA | 2945254 | 4/2017 |

(Continued)

OTHER PUBLICATIONS

USPTO; U.S. Appl. No. 16/901,386; Non-Final Rejection mailed Aug. 5, 2022; (pp. 1-10).

(Continued)

*Primary Examiner* — Tsung Yin Tsai
(74) *Attorney, Agent, or Firm* — Fitch, Even, Tabin & Flannery LLP

(57) ABSTRACT

A maintenance tool and alignment system are provided having a first optical device and a second optical device. The tool includes the at least two optical devices such that they do not occupy the same space or interfere with the tool's function. In some embodiments, the first and second optical devices define or project a first viewing plane and a second viewing plane. The first viewing plane and second viewing plane are transverse to one another and intersect within a field of view of the first optical device creating an intersection. The intersection of the first and second viewing planes allows for the tool, via a processor or a control device, to alignment the tool within a workspace without a dependence on an estimation of a distance of the tool relative to the workspace.

18 Claims, 9 Drawing Sheets

(51) Int. Cl.
*B25J 13/08* (2006.01)
*B25J 11/00* (2006.01)
*B64F 5/40* (2017.01)

(56) References Cited

U.S. PATENT DOCUMENTS

| | | | |
|---|---|---|---|
| 5,598,972 A | 2/1997 | Klein, II et al. | |
| 5,644,394 A | 7/1997 | Owens | |
| 5,857,625 A | 1/1999 | Klein et al. | |
| 5,993,681 A | 11/1999 | Glogovsky | |
| 6,365,221 B1 | 4/2002 | Morton | |
| 7,032,279 B2 | 4/2006 | McCarvill | |
| 7,509,735 B2 | 3/2009 | Philip | |
| 7,531,048 B2 | 5/2009 | Woodcock | |
| 7,792,611 B2 | 9/2010 | Scheer | |
| 7,943,201 B2 | 5/2011 | Hendricks, Sr. | |
| 8,414,264 B2 | 4/2013 | Bolms et al. | |
| 8,759,770 B1 | 6/2014 | Woods | |
| 8,875,655 B2 | 11/2014 | Pettersson et al. | |
| 9,403,244 B2 | 8/2016 | Rautenberg | |
| 9,446,426 B2 | 9/2016 | Bausen et al. | |
| 9,511,496 B2 * | 12/2016 | Sarh | B25J 19/023 |
| 10,208,377 B2 | 2/2019 | Matthews et al. | |
| 10,265,726 B2 | 4/2019 | Dubanchet | |
| 10,688,525 B2 | 6/2020 | Vähänen et al. | |
| 11,679,898 B2 | 6/2023 | Danko | |
| 2005/0073673 A1 | 4/2005 | Devitt | |
| 2005/0131582 A1 * | 6/2005 | Kazi | B25J 9/1697 |
| | | | 700/259 |
| 2008/0233278 A1 | 9/2008 | Hopkins | |
| 2011/0280472 A1 * | 11/2011 | Wallack | G06T 7/80 |
| | | | 901/14 |
| 2013/0135457 A1 | 5/2013 | Kell | |
| 2013/0330466 A1 | 12/2013 | Lochner et al. | |
| 2015/0367516 A1 * | 12/2015 | Sarh | B25J 9/1697 |
| | | | 414/743 |
| 2016/0016317 A1 * | 1/2016 | Trompeter | B25J 9/1692 |
| | | | 700/254 |
| 2017/0016687 A1 * | 1/2017 | Eisermann | F28D 7/103 |
| 2017/0122561 A1 | 5/2017 | Nagaraj | |
| 2017/0268342 A1 | 9/2017 | Roberts | |
| 2017/0292380 A1 | 10/2017 | Diwinsky | |
| 2017/0298875 A1 | 10/2017 | Patel | |
| 2017/0321317 A1 | 11/2017 | Renteria | |
| 2018/0154381 A1 | 6/2018 | Bewlay | |
| 2018/0156062 A1 | 6/2018 | Dede | |
| 2018/0156132 A1 | 6/2018 | Dede | |
| 2018/0223667 A1 | 8/2018 | Danko | |
| 2018/0257235 A1 | 9/2018 | Alatorre Troncoso | |
| 2018/0371914 A1 | 12/2018 | Karigiannis | |
| 2019/0054638 A1 | 2/2019 | Norton | |
| 2019/0095765 A1 | 3/2019 | Lim | |
| 2019/0118209 A1 * | 4/2019 | Rennuit | B25J 13/06 |
| 2019/0143350 A1 | 5/2019 | Kulkarni | |
| 2019/0143358 A1 | 5/2019 | Kulkarni | |
| 2020/0399079 A1 * | 12/2020 | Matye | H04N 7/183 |
| 2021/0005436 A1 | 1/2021 | Vaez-Iravani et al. | |
| 2021/0387301 A1 | 12/2021 | O'Hare | |
| 2021/0387746 A1 | 12/2021 | Danko et al. | |
| 2022/0016669 A1 | 1/2022 | Shang | |
| 2022/0082813 A1 * | 3/2022 | Witzmann | G01N 21/958 |
| 2022/0084180 A1 * | 3/2022 | Witzmann | G06T 7/001 |
| 2023/0271723 A1 | 8/2023 | Danko | |

FOREIGN PATENT DOCUMENTS

| | | |
|---|---|---|
| CA | 2962673 | 10/2017 |
| CN | 110462169 | 11/2019 |
| CN | 110691890 | 1/2020 |
| CN | 109731708 B | 4/2021 |
| EP | 3663515 | 6/2020 |
| IN | 201644036336 | 4/2017 |
| WO | 9703759 A1 | 2/1997 |
| WO | 2013071190 A1 | 5/2013 |
| WO | 2015073196 | 5/2015 |
| WO | 2016076704 A1 | 5/2016 |
| WO | 2018222174 A1 | 12/2018 |
| WO | 2019110418 A1 | 6/2019 |
| WO | 2019210997 A1 | 11/2019 |

OTHER PUBLICATIONS

USPTO; U.S. Appl. No. 16/901,386; Notice of Allowance and Fees Due (PTOL-85) mailed Feb. 7, 2023; (pp. 1-7).

Wu et al.; Image-based camera localization: an overview; Visual Computing for Industry, Biomedicine, and Art (2018) 1:8; pp. 1-13.

USPTO; U.S. Appl. No. 18/144,050; Non-Final Rejection mailed Oct. 18, 2024; (pp. 1-9).

USPTO; U.S. Appl. No. 18/144,050; Final Rejection mailed Mar. 7, 2025; (pp. 1-11).

* cited by examiner

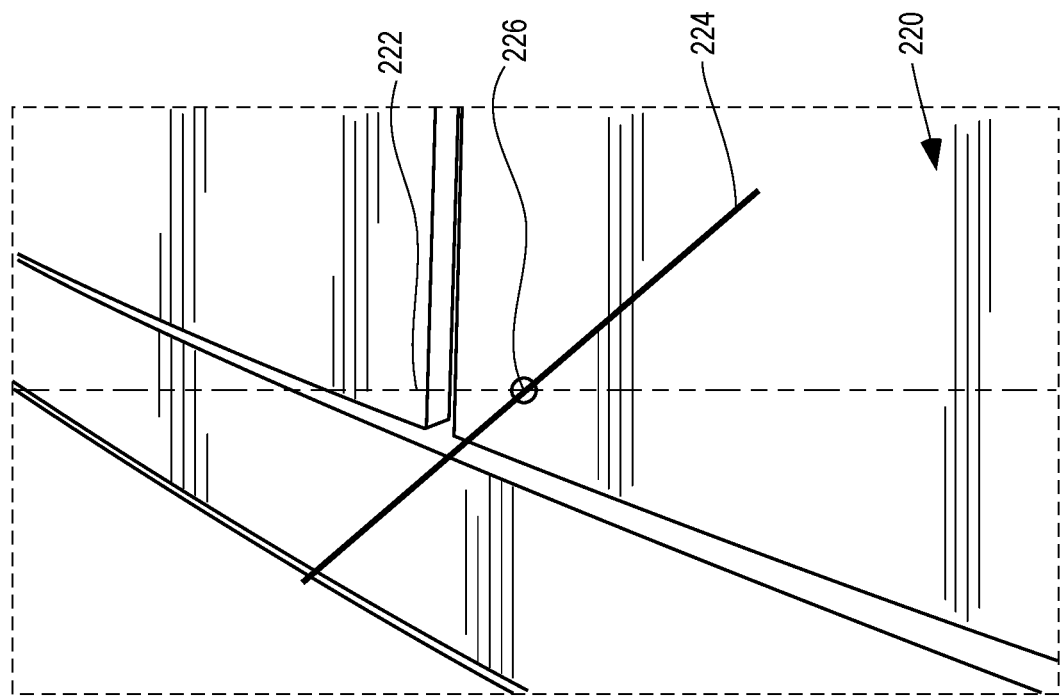
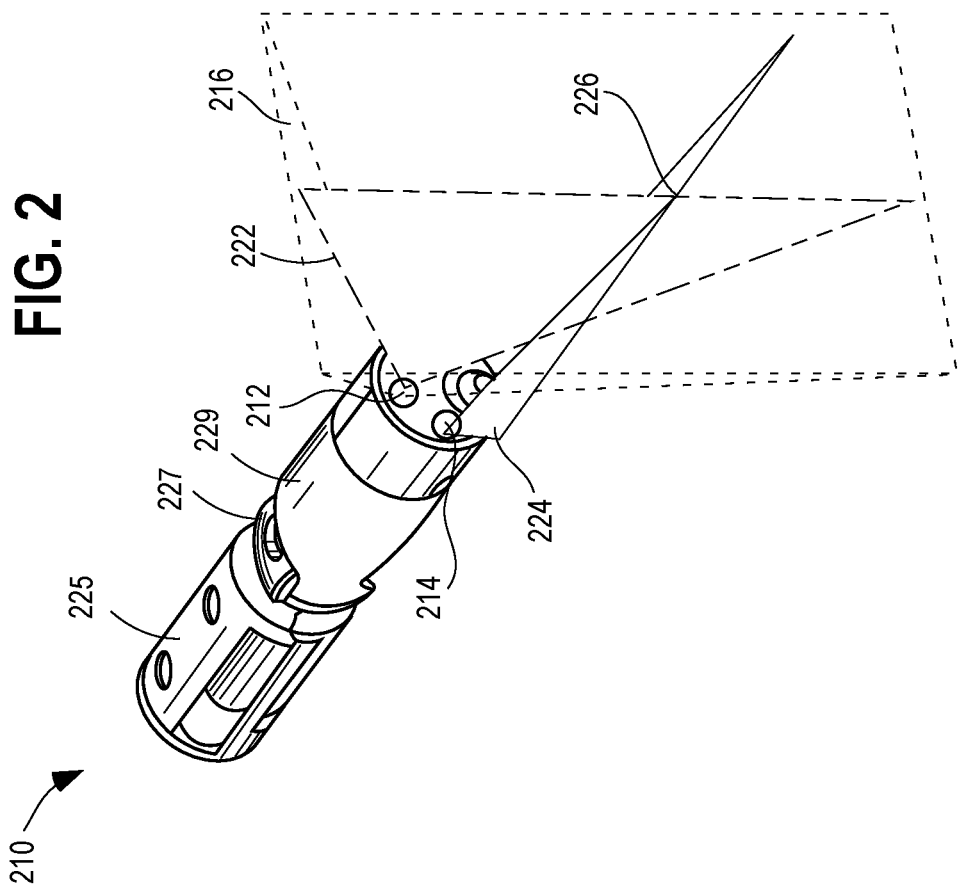
FIG. 2

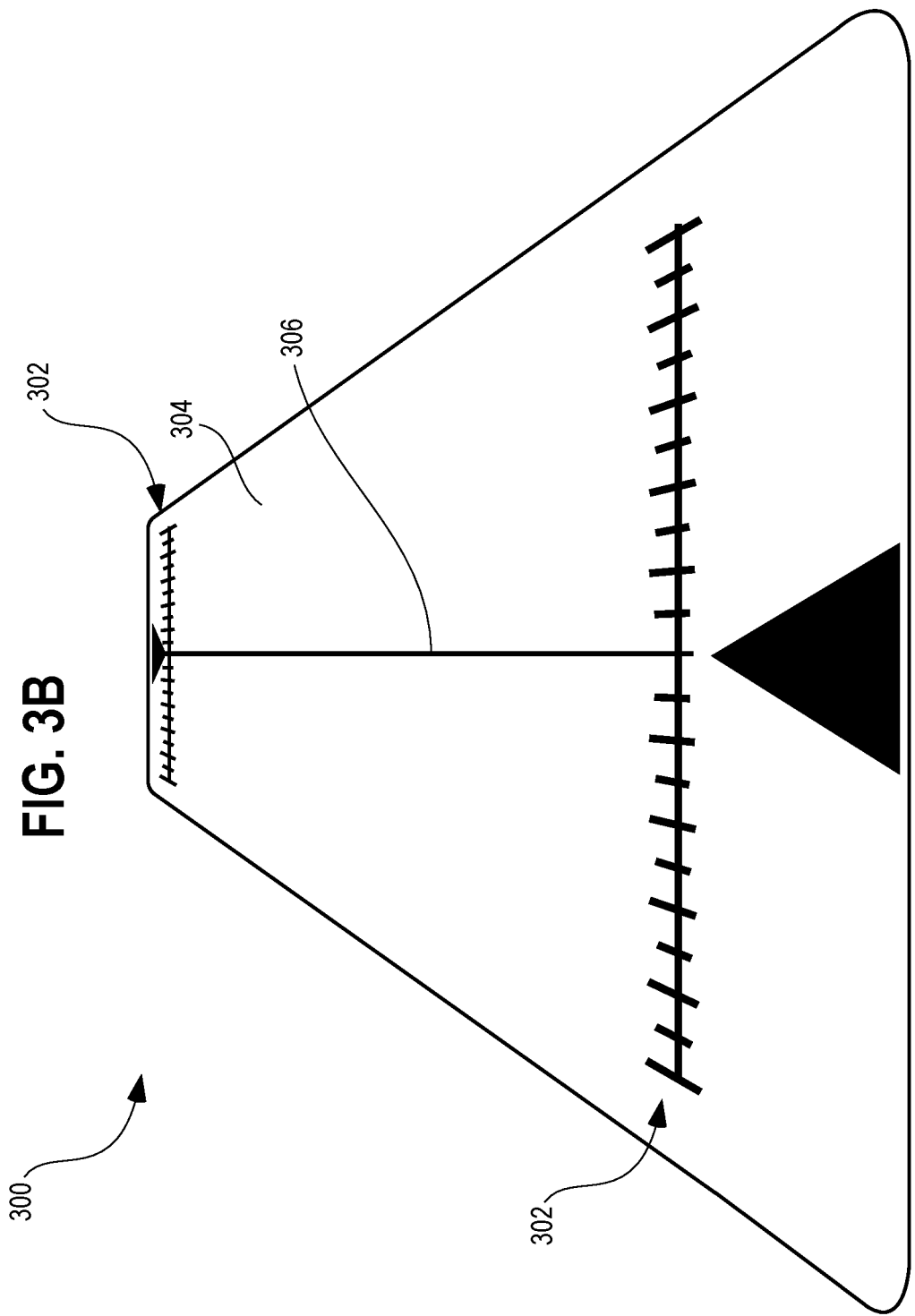

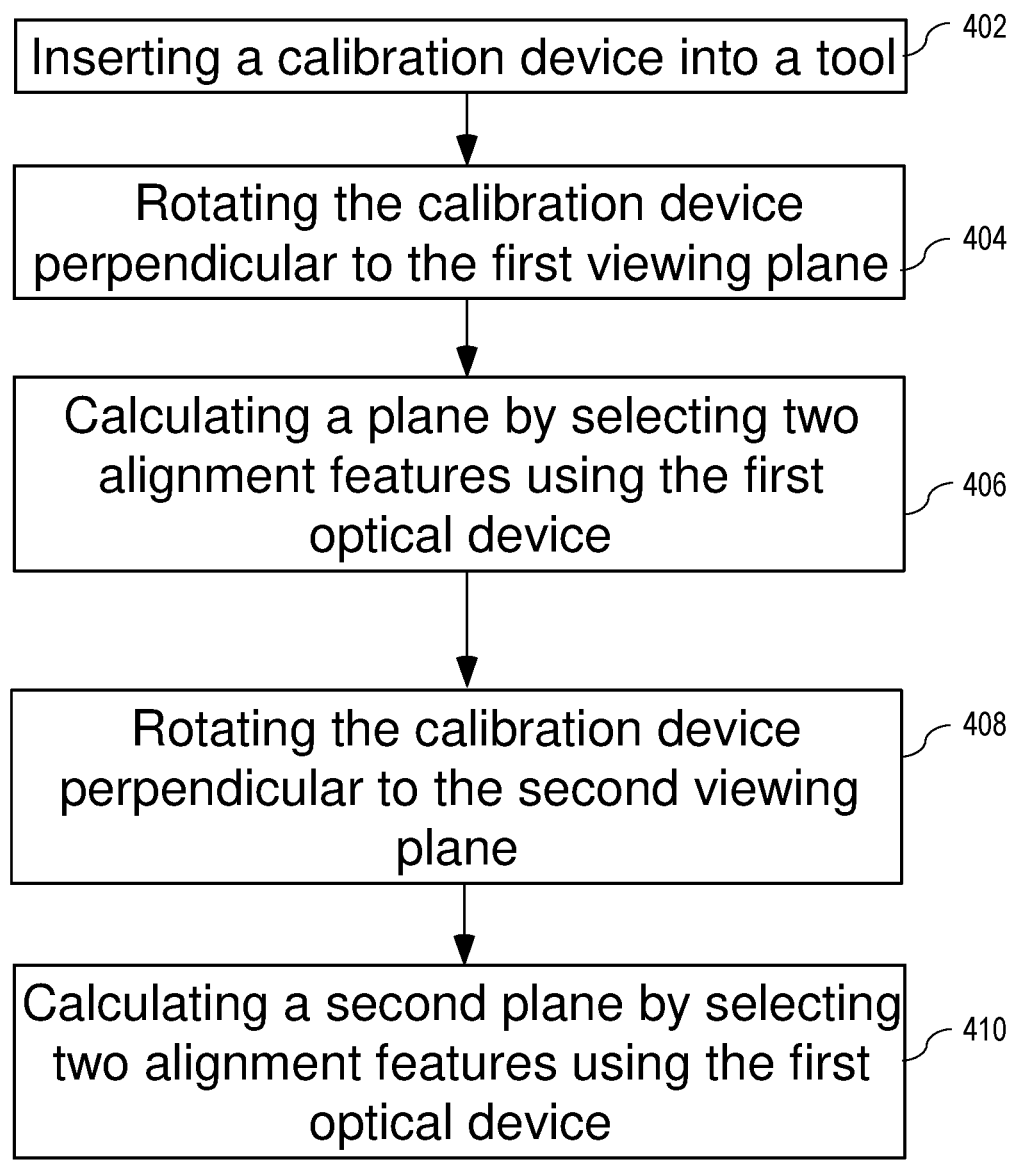

SYSTEMS AND METHODS FOR ALIGNING AND LOCALIZING A TOOL

TECHNICAL FIELD

This disclosure relates generally to a tool and an alignment system for aligning a tool relative to a component within a workspace. More particularly, the present disclosure relates to a tool for alignment and localization within the workspace, wherein the localization occurs without requiring depth sensing relative to one or more components of the workspace. The workspace may be within a machine such as, but not limited to, an aircraft, or aircraft engine.

BACKGROUND

Conventional tools and alignment systems for aligning a tool within a workspace may be limited by a need to determine the relationship or influence between a camera used in conjunction with the tool while the camera and the tool occupy or operate in different locations from one another. These conventional tools and alignment systems may be used for or as a localization system. Conventional tools and alignment systems may additionally or alternatively be limited by a need to determine a depth estimation between the tool, the camera, and/or the workspace.

These conventional tools and alignment systems used for localization may rely on depth estimation to establish a location of a center of the system and may further necessitate visible features within the workspace or on a component for registration. These conventional systems may also utilize a general structured light sensor, which may further necessitate depth estimation to establish a center location of the system. Relying on depth estimation to localize the tool within the workspace may be undesirable or difficult when the position of the tool within the workspace is unknown.

Finally, some systems may rely on two intersecting laser planes. These systems relying on two intersecting planes commonly display a cross-hair onto a target work area to perform alignment but also rely on a human operator who visualizes the projected cross-hair either directly or through a camera, which may require at least one camera or visualization access and two non-co-located laser projections to confirm and ensure alignment has occurred.

BRIEF DESCRIPTION OF THE DRAWINGS

Disclosed herein are embodiments of systems, apparatuses, and methods pertaining to tool alignment for performing localization without requiring depth sensing. This description includes drawings, wherein:

FIG. 2 is an illustration of an exemplary spray tool having a camera as a first optical device and a laser as a second optical device.

FIG. 3B is a perspective view of a portion of the calibration device.

FIG. 4 is flow diagram of a method for aligning the tool.

Figure 1:
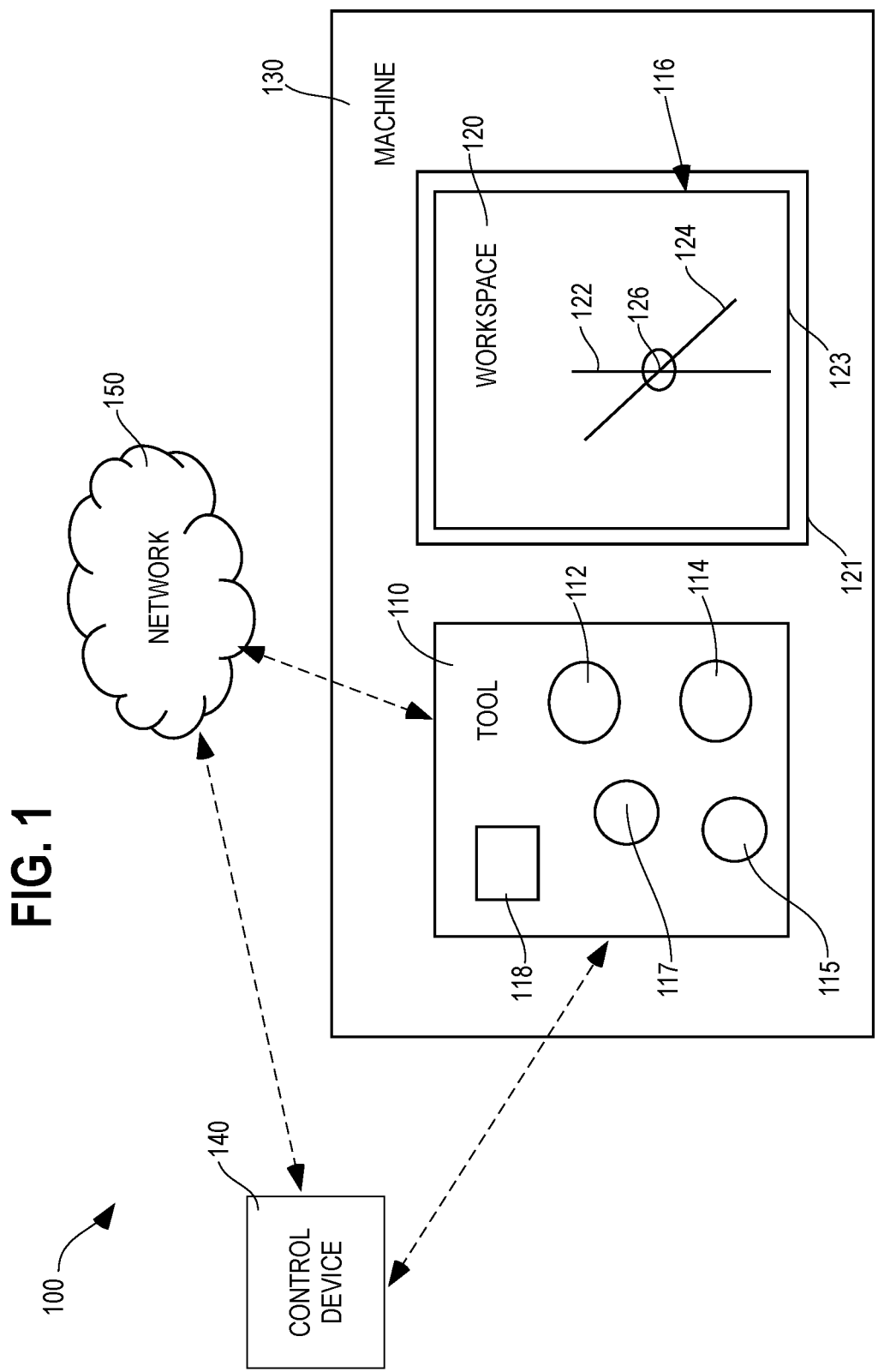
FIG. 1 is a block diagram of a system for aligning a tool within a workspace of a machine in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, tools and systems are provided herein for producing a human or machine interpretable alignment point, without a reliance on a depth estimation. The systems provided herein may utilize optical devices that may not occupy interfering with the tool in a workspace.

The following description is not to be taken in a limiting sense but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present disclosure. Thus, appearances of the phrases "in one embodiment," "in an embodiment," "in some embodiments", "in some implementations", and similar language throughout this specification may, but do not necessarily, all refer to the same embodiment.

A tool for performing an operation in a workspace is provided having a first optical device with a field of view and a first viewing plane, a second optical device located adjacent to the first optical device. The second optical device having a second viewing plane. At least one of the first optical device and second optical device is a camera. The first viewing plane and second viewing plane may be projected, virtually or visibly, into the workspace. The tool may align an intersection or intersection point of the first viewing plane and second viewing plane to a desired location to align the tool. An alignment system may utilize the tool. The tool having the first optical device and second optical device may be communicatively coupled to a control device via a processor. The control device may determine a location of the intersection of the first viewing plane and second viewing plane. The control device may adjust a position of the tool to align the tool such that the intersection is aligned with the desired location.

FIG. 1 is block diagram of a system 100 for aligning a tool within a workspace of a machine including a display 121 and an image 123 of the workspace in accordance with some embodiments. The system 100 includes a tool 110 for performing a function or operation, such as inspection, repair, maintenance, or diagnostic function, and/or spraying, painting, or treating a surface within a workspace 120 within a machine 130. The machine 130 may be, for example, an aircraft, or component of the aircraft such as an engine, an aircraft wing, or some other portion of the aircraft. The workspace 120 may be located within the machine 130, such as a specified area of the machine 130, a component within the machine 130, or a particular space within the machine 130. In some embodiments, the workspace 120 may be on an inner surface of the machine 130, or component, an outer surface of the machine 130, or some combination of inner and outer surface thereof.

The tool 110 includes a first optical device 112 and a second optical device 114. The first and second optical devices 112, 114 may both be cameras. Cameras may be, for example monocular cameras, or other suitable optical devices. Alternatively, the optical devices 112, 114 may also be one camera and one laser, or one laser and one camera, respectively. The optical devices 112, 114 may be mounted on the tool adjacent to one another. In some embodiments, the first and second optical devices 112, 114, may be located inside the tool 110. The optical devices 112 and 114 may be mounted or located relative to the tool 110 such that they do not occupy the same space as the tool 110. Occupying the same space as the tool 110 may include the optical devices 112 and 114 not occupying the immediate vicinity or space the tool 110 is functioning or operating in. This may allow for the optical devices 112 and 114 to not interfere with the function or operation of the tool 110. Further, the first and second optical devices 112, 114, may be mounted, housed, and/or oriented substantially parallel to the body of the tool 110. The tool 110 may be, for example, a maintenance tool, such as a spray nozzle, or some other tool for inspection, repair, maintenance, or diagnosis.

The first optical device 112 may be a camera having a field of view. The first optical device 112 may be configured to define, include, or project a first viewing plane 122 or reference plane defined within the field of view. The first viewing plane 122 may be defined as the center of an image (e.g., the field of view in image space) of the first optical device 112. The first viewing plane 122 may be virtual and invisible to the human eye. The first viewing plane 122 may also be derived by using a calibration tool discussed below with reference to FIG. 3A. The first viewing plane 122 may also be referred to as an image-space plane projected virtually, or overlaid on the image 123, such that the first viewing plane 122 is visible when shown on an image generated by the first optical device and displayed on a display of the tool 110, but is not visible on the workspace 120 when the workspace 120 is viewed directly with the human eye.

The second optical device 114 may be a laser and may be configured to project a second viewing plane 124 which may be seen on the image 123. The second viewing plane 124 is transverse, at any non-parallel angle, relative to the first viewing plane 122 and the viewing planes 122, 124 define an axis of intersection that is shown as a point or intersection in an image 123 of the field of view of the first optical device 112. The second viewing plane 124 may be a virtual projection via a second camera or visible projection via a laser in the workspace 120 such that it is projected onto the workspace 120 in operation. The first viewing plane 122 and second viewing plane 124 may define an intersection 126 in the image, or intersection point, of the planes, such as a cross point. In a two camera system, the second viewing plane 124 is defined as described above with reference to the camera and the first viewing plane 122. The first viewing plane 122 is derived but the second camera would be from a different location allowing the second viewing plane 124 from the second camera to intersect with the first viewing plane 122 from the first camera at a line that passes through the tool (e.g., a tool alignment ray). Each camera defines a plane that is tied to the physical location of the camera, so each plane must be derived by the camera used.

The intersection 126 may be aligned to a desired location within the workspace 120, without requiring distance estimation of the tool 110 relative to the workspace 120. The first viewing plane 122 and the second viewing plane 124 may both be projected, virtually or visibly, from the tool 110. Further, the second optical device 114 may be integrated or coupled to a portion of the tool 110 such that the second viewing plane 124 intersects the first viewing plane 122, which may occur substantially in the center of the image of the field of view. This may, for example, be the center of operation of the tool 110, such as the center or approximate center of a spray area for a nozzle of a spray tool (e.g., a point where an axis of the nozzle intersects a component or workspace).

In two camera systems, each camera may be located in distinct positions with regard to the alignment ray (e.g., the center line coming from the tool 100). Both cameras would generate a line in image space which passes through the optical center of one designated camera, as well as through the center of the tool alignment ray. Because each camera is in a different location from the tool, these two lines in image space may be superimposed by superimposing the images themselves with the lines drawn on the images. The point of intersection between the two lines in image space in the superimposed images may result in the point for alignment.

In other embodiments there may be a plurality of optical devices such as a third additional optical device. These additional optical devices are optional and may provide additional information to the system 100. The third optical device 115 may be a camera or a laser. The combinations of the first and second optical devices 112, 114, with the third optical device 115 may be two cameras and one laser, one camera and two lasers, and in further embodiments a fourth optical device 117 may be used having two cameras and two lasers.

In other embodiments, where more than two optical devices are utilized, there is at least one camera, and the at least one camera defines a camera field of view, similar to that described with reference to FIG. 1. The at least two other optical devices define the first viewing plane 122 and the second viewing plane 124, as described with reference to FIG. 1, being virtual or visible. These viewing planes define the intersection 126 of the viewing planes 122, 124. To align the tool 110 to the desired location within the workspace 120, the intersection 126 of the viewing planes 122, 124 in an image is aligned with the desired or target location to perform the task in the image.

In an embodiment where two lasers in connection with one camera are utilized, the intersection 126 of the first viewing plane 122 and the second viewing plane 124 may be visible independent of a display. In this embodiment it is possible for a human operator to manually align the tool 110 to the desired location within the workspace 120, without requiring a distance estimation of the tool 110 relative to the workspace 120. The alignment of the tool 110 may be done without requiring the distance estimation by observing the intersection 126 of the viewing planes 122, 124 visibly projected by the lasers to the workspace through the camera. In this embodiment, the viewing planes are transverse to one another.

The tool 110 may further include one or more processors 118. The one or more processors 118 or processing units may be provided within the tool 110 and/or on the tool 110. The one or more processors 118 may also be situated similarly to the optical devices 112, 114, such that the one or more processors 118 do not occupy the same space or interfere with the function or operation of the tool 110. The one or more processors 118 may further be configured to communicate and exchange data with a control device 140.

The control device 140 or system may be located remotely from the workspace 120. The control device 140 may also be located remotely from the machine 130 as illustrated in FIG. 1. The control device 140 may also be located remotely from the tool 110. Alignment may occur after localization and/or after calibration.

The control device 140 and/or the one or more processors 118 are configured to communicate with the tool 110 across a communication network 150 (e.g., LAN, WAN, Internet). The virtual and/or visible planes may be interpretable by the camera, the one or more processors 118, and/or the control device 140. The control device 140 may send commands to the processor 118 based on the processing of signals containing information regarding the location of the intersection 126 or a cross pattern received from the processor 118. Such signals may be communicated across the network 150 and used to align the tool 110 to a desired location within the workspace 120, without requiring a distance estimation of the tool 110 relative to the workspace 120.

By way of example, the system 100 may further comprise the one or more processors 118, the control device 140, or the network 150. The control device 140 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control device 140 can be part of control circuitry and/or a control system, which may be implemented through the one or more processors 118 with access to one or more memory that can store tool paths, specific location in, on, and/or around the aircraft component, or the desired location. In some applications, the one or more processors 118, and/or the control device 140, may be distributed over a communications network (e.g., LAN, WAN, Internet) providing distributed and/or redundant processing and functionality. Further, the one or more processors 118, the control device 140, and/or the network 150 can be configured for wired, wireless, optical, fiber optical cable, satellite, or other such communication configurations or combinations of two or more of such communications.

In use, the first optical device 112 may display the field of view as an image. Within the image, the first viewing plane 122 may be displayed (e.g., overlaid) or visible. The first viewing plane 122 may be considered the centerline shown substantially in the center of the image corresponding to the field of view. The second viewing plane 124 may be displayed (e.g., overlaid) or visible. In the image, the viewing planes 122 and 124 intersect one another at an intersection 126. To align the tool 110, the intersection 126 is aligned with a desired location of the workspace 120 in the field of view of the first optical device 112. Once aligned, the tool 110 may complete the function or operation intended, as discussed above. The function or operation intended may include functions inspection, repair, maintenance, or diagnostic function and/or spraying, painting, or treating the surface of the component. If the tool 110 is being used in the interior of the component, the tool 110 may be inserted into an access port such as a borescope or other access port before alignment and completion of the intended function.

The system 100 may further include a display 121. The display 121 may be part of the control device 140 or in communication with the control device 140, the tool 110, and/or the network 150. In some embodiments, the image 123 of the field of view 116 may be shown on the display 121. Within the image 123, the first viewing plane 122 from the first optical device 112 may be overlaid on the image 123, but not visibly on the component independent of the display 121. The image 123 of the field of view 116 may come from the first optical device 112. The second optical device 114 may display, project, or define the second viewing plane 124 in the image 123 shown on the display 121, resulting in the intersection 126. In some embodiments when the second viewing plane 124 is virtual, the system 100 may overlay the second viewing plane 124 on the display 121. In other embodiments, the second viewing plane 124 may be visibly shown on the component independent of the display 121, and thus visible on the display using the first optical device 112.

The system 100 may align the tool 110 without requiring a distance estimation of the tool 110 in the workspace 120. Using a known first viewing plane 122, a known second viewing plane 124, and a known intersection 126, the system 100 is capable of aligning the tool 110 within the workspace 120 without requiring a distance estimation between the tool 110 and the desired location or component. The first viewing plane 122 may be defined as the center of the image of the field of view (or another image-space plane), thereby allowing for the system 100 to have a known first viewing plane 122. The system 100 may also utilize the second viewing plane 124. The system 100 may determine the intersection 126 without a reliance on a depth estimation. Without a reliance on the estimate of a depth to align the tool 110 within the workspace 120 allows for a reduction in size of the tool 110 allowing for the tool 110 to perform the desired function in a potentially smaller or more confined space. This may further allow for the desired function or operation to be done faster and/or more efficiently.

FIG. 2 is an illustration of an exemplary tool 210 including an image of a workspace in accordance with an embodiment. For illustrative purposes only, a spray tool 210 is illustrated, and may be associated with spraying, painting, or treating the surface of a component within an aircraft, such as an aircraft engine or aircraft wing, or inside of an aircraft component. In this embodiment, the first optical device is a camera 212, and the second optical device is a laser 214. The camera 212 and the laser 214 may be located or mounted within the tool 210, on the tool 210, and/or in a way such that they do not occupy the same space or interfere or operation with the function of the tool 210.

The camera 212 generates an image of a field of view 216 within a workspace 220. Within the center of the image of the field of view 216, the camera 212 has a first viewing plane 222, or a reference plane, that is virtually projected in the field of view 216. The first viewing plane 222 may be referred to as an image-space plane which is virtually defined (e.g., overlaid on the image) as the center of the field of view 216 projected to a workspace 220. In this illustrative embodiment, the laser 214 projects a visible plane, a second viewing plane 224, within the field of view 216. The second viewing plane 224 is transverse to, at any non-parallel angle, relative the first viewing plane 222 creating an intersection 226, or cross pattern in the image. The relative angle of the viewing planes 222 and 224 may or may not be perpendicular and may be at an acute angle. The intersection 226 is an end view of an axis (viewed as a point) where the first viewing plane 222 and second viewing plane 224 intersect. The intersection 226 occurs in the image of the field of view 216.

To align the tool 210 within the workspace 220, a user or alignment procedure done by a control device may align the intersection 226 with the desired location (e.g., on a component). In this embodiment, because the first viewing plane 222 is virtual (e.g., shown overlaid on the image) and the second viewing plane 224 is visible on the workspace 220, only the second viewing plane 224 may be visible by a human when projected onto the workspace 220 independent of the display. In other embodiments, both the first viewing plane 222 and the second viewing plane 224 may be visibly projected from the tool 210 onto the workspace 220.

In operation, the tool 210 may be utilized on the surface of an aircraft component (e.g., see FIG. 5), defining the machine and workspace 220. In other operations, the tool 210 may be implemented for uses inside an aircraft component. In these operations, the tool 210 is inserted through an opening, such as a borescope port to perform the task relative to the workspace 220 inside. Because the camera 212 and the laser 214 are configured to not interfere with the function or operation of the tool 210, such as spraying, painting or treating the workspace, the tool 210 has the advantage of being capable of utilization in smaller areas within a machine, such as an aircraft component.

Figure 3A:
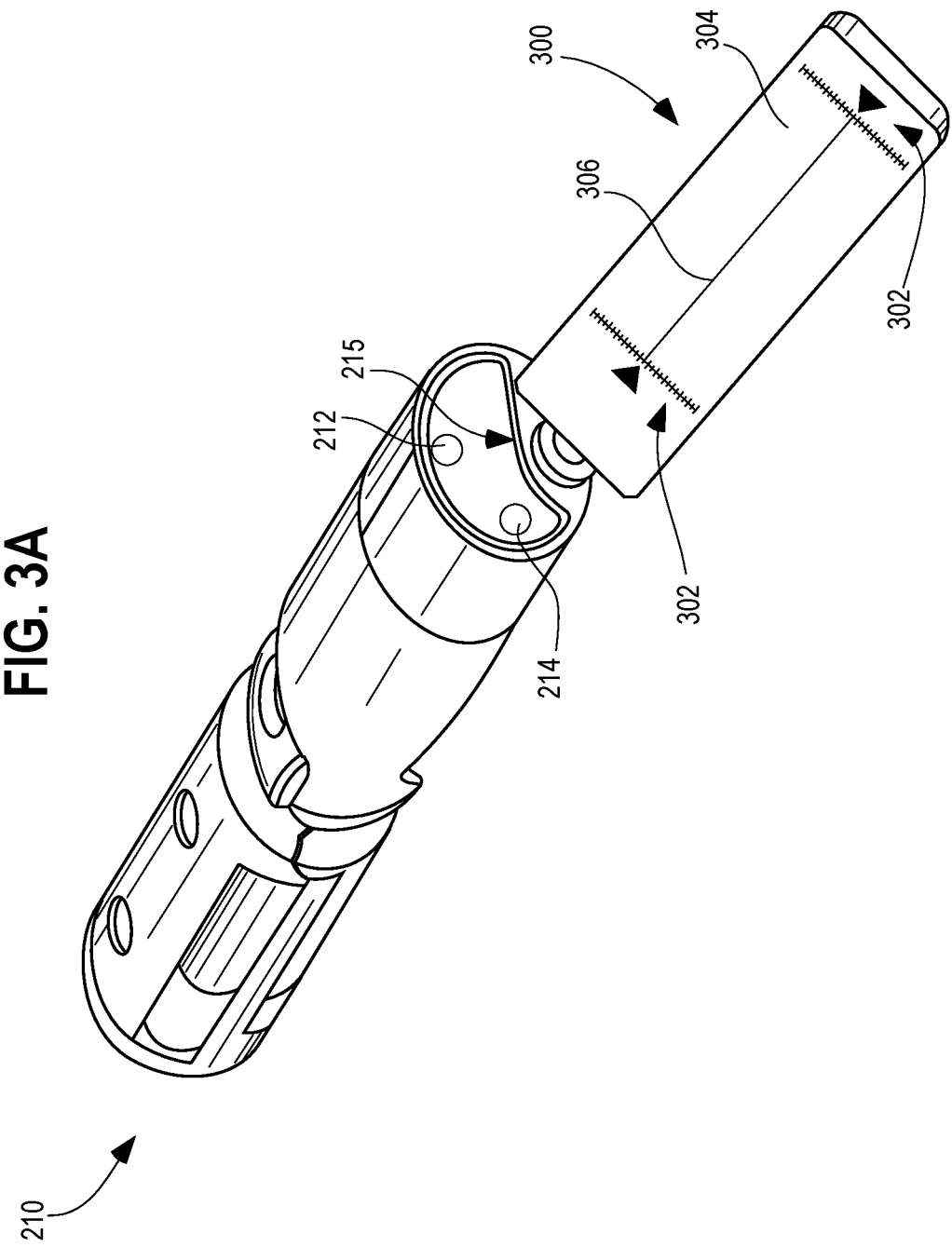
FIG. 3A is a perspective view of the spray tool of FIG. 2 and a calibration device coupled to the spray nozzle.
Figure 3C:
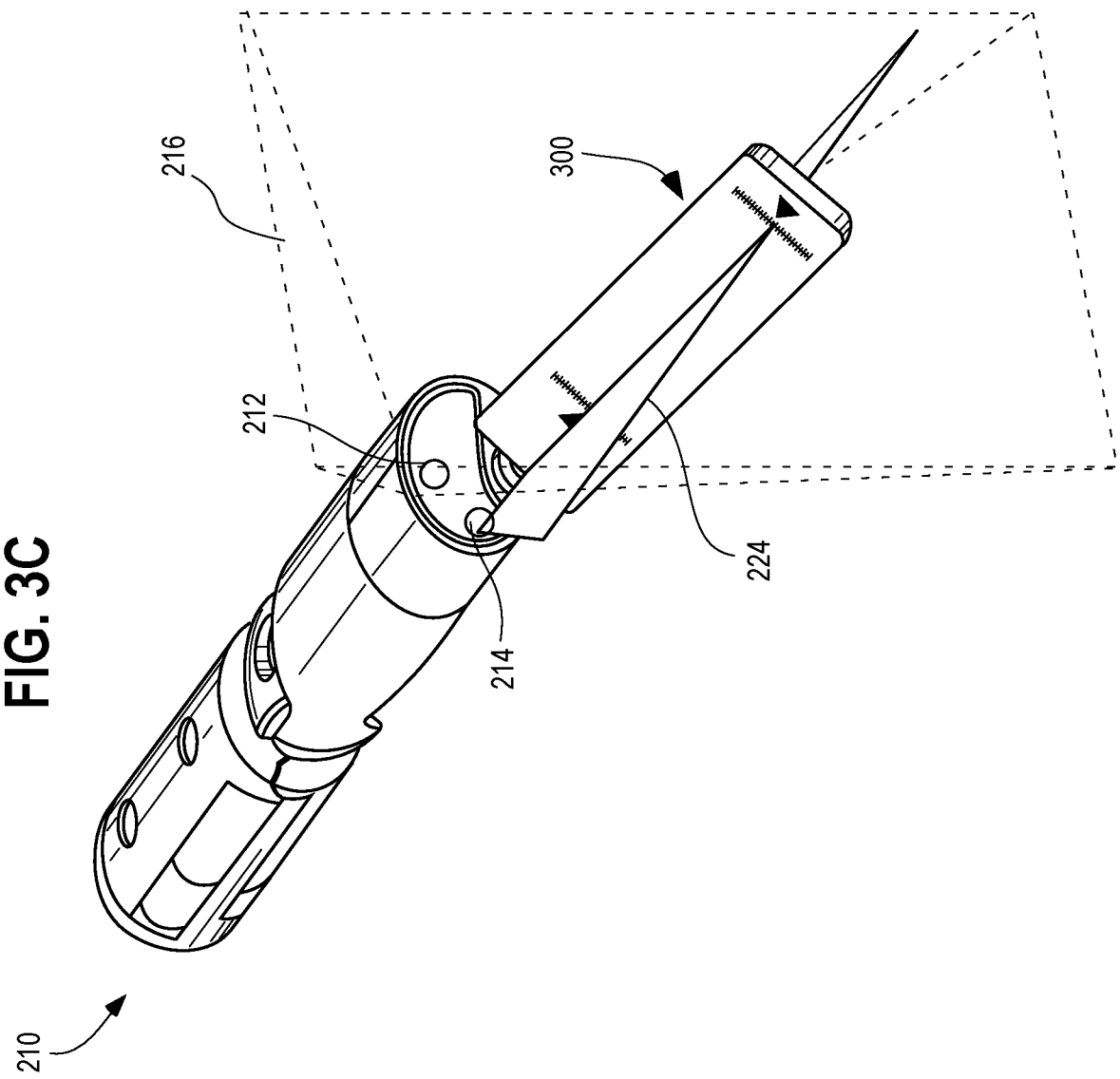
FIG. 3C is a perspective view of the spray tool of FIG. 2, illustrating a field of view of the first optical device and the viewing plane of the second optical device.
Figure 3D:
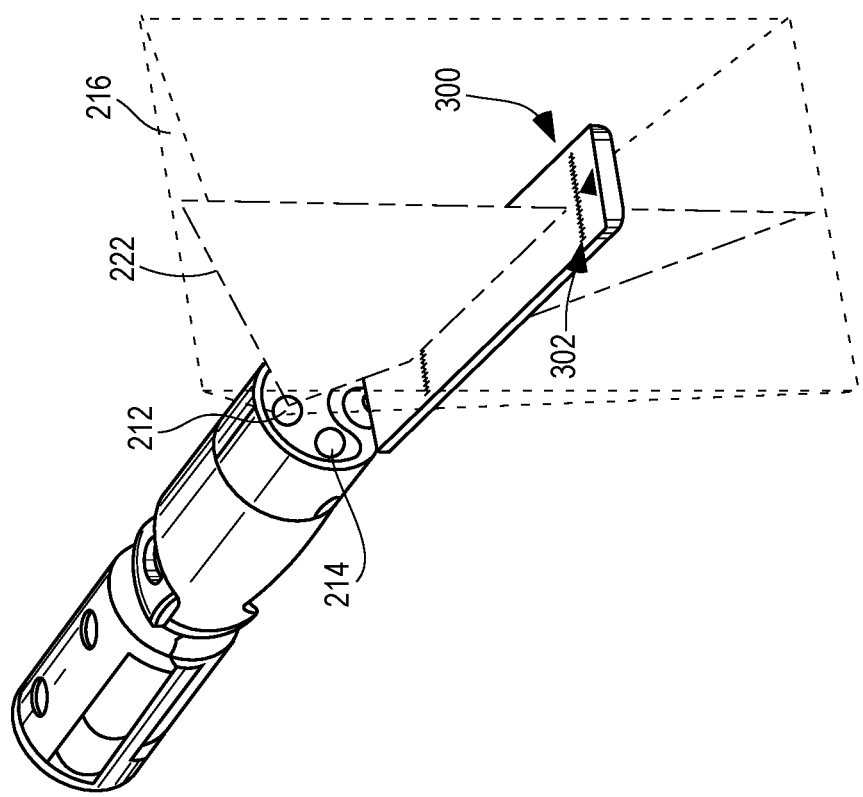
FIG. 3D is a perspective view of the spray tool of FIG. 2, illustrating the field of view of the first optical device and the viewing plane of the first optical device.

FIGS. 3A-3D illustrate the tool 210 of FIG. 2 having a calibration device 300 coupled thereto. FIG. 3A illustrates the calibration device 300, or tool, inserted into a nozzle receptacle 215 of the tool 210. In this illustration, the calibration device 300 is shown, rotated at an angle relative to the tip of the tool 210. FIG. 3B illustrates the calibration device 300 having alignment features 302 on the surface thereof. FIG. 3C illustrates the calibration device 300 inserted into the nozzle receptacle 215 of the tool 210. In this illustration the calibration device 300 is shown rotated perpendicular to the second viewing plane 224 created by the laser 214. While the angle is illustrated as perpendicular, the angle of rotation of the calibration device 300 is not limited to degrees. FIG. 3D illustrates the calibration device 300 inserted into the tool 210 and rotated perpendicular to the first viewing plane 222 created by the camera 212.

In this embodiment, the calibration device 300 is a removable paddle or wand. However, other suitable shapes, dimensions and types of components devices may be used having an appropriately shaped surface for performing the projection and calibration for embodiments of the tools described herein. In the illustrated embodiment, the calibration device 300 is inserted into the nozzle receptacle 215 of the tool 210. The calibration device 300 may include a plurality of alignment features 302 on a surface 304 that provide visual cues to calibrate the first and/or second viewing planes 222, 224 from the camera 212 and the laser 214, respectively. One or more line markings 306 may also be provided on the surface of the calibration device 300 for further confirmation of alignment of one or both of the first and second viewing planes 222, 224. In particular, the line markings 306 and the alignment features 302 may define points on the surface 304 that, along with the location of the camera 212 or laser 214, define the viewing planes 222, 224, respectively.

In some embodiments, the first viewing plane 222 may be aligned relative to the tool by overlaying a line representing the first viewing plane 222 on an image of the surface 304 of the calibration device 300 (see FIG. 3D). Once overlaid, the line representing the first viewing plane 222 is be aligned with the alignment features 302 (e.g., aligned with the line markings 306 and/or two points where the line markings 306 meeting the alignment features 302). Once aligned, the first viewing plane 222 may define an image space projection relative to a focal point of the camera 212. This may allow the system, in some embodiments, to define the first viewing plane 222 relative to the tool 210 and thus the workspace 220 without requiring an estimation of a distance between the tool 210 and the desired location. In other embodiments, the first viewing plane 222 may be selected, chosen, and/or defined as the center line of the field of view 216.

Similarly, this alignment and calibration can be done for the second viewing plane 224 such that the second viewing plane 224 is defined relative to the tool 210 without requiring an estimation of a distance between the tool 210 and the desired location, described in more detail below.

In operation, the alignment features 302 and/or line marking 306 of the calibration device 300 may be used to give a human interpretable alignment confirmation for the first viewing plane 222 and the second viewing plane 224, however the calibration device 300 may also provide a machine interpretable alignment confirmation as well. In some embodiments, the alignment features 302 and/or line marking(s) 306 of the calibration device 300 may also be used to assist with determining, calculating, or measuring the rotation of the calibration device 300 and the positioning of the tool 210. The alignment features 302 may provide two known locations on the calibration device. Utilizing those two known locations, as well as the known location of the camera 212 and/or the laser 214, and the line marking 306 aligned with the viewing planes 222, 224, the tool 210 can define a plane utilizing the known locations and markings such that the plane is known to the tool 210.

Embodiments herein also include methods for aligning a tool, such as the tool 210 from FIG. 2 within a workspace 220. The first viewing plane 222 and the second viewing plane 224 are shown in the image (e.g., in the image space) of the field of view 216 respectively. The first viewing plane 222 and the second viewing plane 224 create an intersection 226. This intersection is interpretable by a machine, such as the one or more processors 118, the control device 140, and/or the network 150 as described in FIG. 1 using feature recognition techniques with image processing. When the tool 210 is directed at a workspace 220, the intersection 226 defines a point on an image of the workspace 220, and the intersection 226 is used to determine the alignment of the tool 210 relative to a desired location within the workspace 220, without requiring an estimation of a distance of the tool 210 relative to the workspace 220.

The location of the tool 210 is determined using the localization method discussed below with reference to FIG. 5, and the intersection 226 is used to align the tool 210. Because of this, the system does not rely on the use of a depth measurement to determine the alignment of the tool 210 relative to the workspace 220. This allows the system to be utilized when the distance to desired locations cannot be measured or measured with adequate accuracy. This method may further allow for fewer devices coupled to or used in conjunction with the tool 210 that are needed to measure distance.

Further, in embodiments that utilize more than one laser, such as a system with two lasers and one camera, or two lasers and two cameras, the intersection may be visually displayed on the component or desired location and a human operator may manually align the tool 210 in the workspace 120. The processing means, such as the one or more processors 118, the control device 140, described above with reference to FIG. 1, may automatically and remotely align the tool 210 with the desired location within the workspace 120.

The exemplary system 100 and tools 210 and 300 described herein may be implemented using a number of components including sensors, circuits, systems, functionality, apparatuses, processes, or devices not shown, but would be understood by one of ordinary skill in the art.

FIG. 4 illustrates a method 400 for calibrating a tool. In step 402, a calibration device 300 is inserted into the tool 210. The calibration device 300 may be inserted into the end of the tool 210 (e.g., into a spray nozzle of the tool 210).

In step 404, the calibration device 300 is rotated perpendicular to the first viewing plane 222.

In step 406, a first viewing plane 222 associated with a first optical device 212 may be defined using the calibration device 300. Where the first optical device 212 is a camera, the calibration device 300 is in an image of a field of view 216 of the first optical device 212. The tool 210, via a processor or control device, similar to that described in FIG. 1, calculates the line by selecting two points in the image of the calibration device 300 where the two points are defined by the alignment features 302. The line is overlaid on the image. The line representing the first viewing plane 222 may be in the center of the image of the field of view 216 but may also be at any location within the image of the field of view 216.

In step 408, the calibration device 300 is rotated perpendicular to the second viewing plane 224. A second viewing plane 224 is projected onto the calibration device 300 by a second optical device 214. For example, the second optical device 214 is a laser.

In step 410, the tool via a processor or control device, similar to that described in FIG. 1, calculates a second plane by selecting two alignment features 302 using the first optical device 212, as described above.

Embodiments of methods for localizing tools herein such as the tool 210 from FIG. 2 in the workspace 220 are also provided. The tool 210 may have a first unknown actual location or position and a second known target or final location or position. To localize the tool 210 within the workspace 220 the actual position of the tool 210 is determined relative to the workspace 220 (e.g., including a component). Once localized, actual location of the tool 210 is determined and the tool 210 may be moved from the first actual location to a second target location.

The tool 210 may further include a proximal body 225, a distal body 229, and a wrist 227 having two degreed of freedom connecting the proximal body 225 and distal body 229, the wrist 227 further includes two rotating actuators. The angles of the two rotating actuators define an angular heading of the tool 210 described below. The location of the tool 210 is determined at the wrist 227 with the method below as the proximal body 225 does not move (e.g., remains stationary once inserted), however the distal body 229 moves to align the intersection 226 with the known points on the component.

During the localization process, the proximal body 225 of the tool 210 may remain stationary and the wrist 227 of the tool 210 may be controlled to point, target, and/or re-orientate distal body 229 such that the intersection 226 is aligned with different known locations within the workspace 220. The proximal body 225 of the tool 210 remains in the same location such that a first actual location of the wrist 227 or proximal body 225 can be determined while the wrist 227 can move to target different points as part of the localization of a stationary portion of the tool 210.

The known locations are defined by a computer aided design (CAD) model of a particular component 500. This may include knowing the coordinates of known locations (502, 504, 506, 508) within the workspace. The tool 210, utilizing the method described above to align the tool within the workspace, targets each of the known locations on the component manually by an operator and/or utilizing machine vision and visual servoing algorithms. For example, the tool 210 and/or an operator may align or overlay the intersection 226 with the first location 502 on the aircraft component. Once aligned, the tool 210 may determine an orientation of the tool 210, such as an angular heading between the tool 210 and the first location 502 on the aircraft component. Determining the orientation of the tool 210, such as an angular heading, is repeated for each known location (502, 504, 506, and 508).

The tool 210, via the camera 212 as described in FIG. 2, and/or the one or more processors 118, the control device 140, as described in FIG. 1, and/or an operator, may determine if the targeted first location has been identified. If the first location has not been identified, the alignment step may be repeated until the first known location has been identified. The identification of the first known location may be accomplished using a computer vision algorithm. For identifying the subsequent known locations, the system determines expected values of the subsequent known locations to compare. Once identified, the tool 210 aligns itself with the first location. If the tool 210 is not aligned with the first known location, the one or more processors 118, the control device 140, and/or the network 150 as described in FIG. 1 may calculate a command to align the tool 210 with the first known location and repeat this step until the tool 210 is aligned with the first known location. The user may also manually align the tool 210 with the first known location.

Once the first known location has been identified and aligned, the tool 210 may record or register a tool path, such as an angular heading, or ray from the tool 210 to the first known location. The recorded tool path allows the system to record the angle between the known point and the actual location of the tool 210 within the workspace 220. This process of targeting, identifying, and aligning the known locations relative to the tool 210 and registering a tool path between the tool 210 and the known location may be repeated n times for n different known targeted locations, where n is greater than or equal to 3.

In determining the angular heading from the tool 210 to a known location, the tool 210 may include a 3-axis accelerometer, a 3-axis gyro and a 3-axis magnetometer that provide data which may be used to estimate the angular heading. Additionally, the roll and pitch motions of the tool 210 may be created using stepper motors. The stepper motor motions are typically regular and deterministic, so a command of n steps will result in m degrees of motion as long as there were no external interferences such as collisions.

Once the tool paths for each known location have been registered, the system and/or the tool 210, via the one or more processors 118 and/or the control device 140, as described in FIG. 1, may use an iterative process to minimize the root-mean-square-error ("RMSE") of the current position of the tool 210 or camera 212 using the registered tool paths and the coordinates of the known locations. The minimization process is repeated until the RMSE is below a pre-set or pre-defined threshold. If the RMSE is below the threshold, the system 100 has determined the actual position of the tool within the workspace 220 within an acceptable amount of error, and subsequently may move the tool 210 to another position such as the final position. If the RMSE is above the threshold, the system may start over and repeat the method.

The minimization process discussed above may be accomplished by using the coordinate sets of the known locations and comparing those to the corresponding tool paths or rays from the tool 210 targeting and aligning with the known locations. In the comparison, a transformation matrix results which defines the position and orientation of the tool relative to the final position and orientation. This may be accomplished by minimizing the distance between the known locations and the tool paths. To minimize the distance between the known locations and the tool paths, the system may find the closest location on the individual tool paths to the known coordinates of the corresponding known locations, these points may be projected onto the tool paths. This process may be iterative. Once the projected points on the tool paths have a threshold lower than the pre-defined RMSE as compared to the coordinates of the known locations, the actual position of the tool 210 relative to the workspace 220 and final position may be determined.

Figure 5:
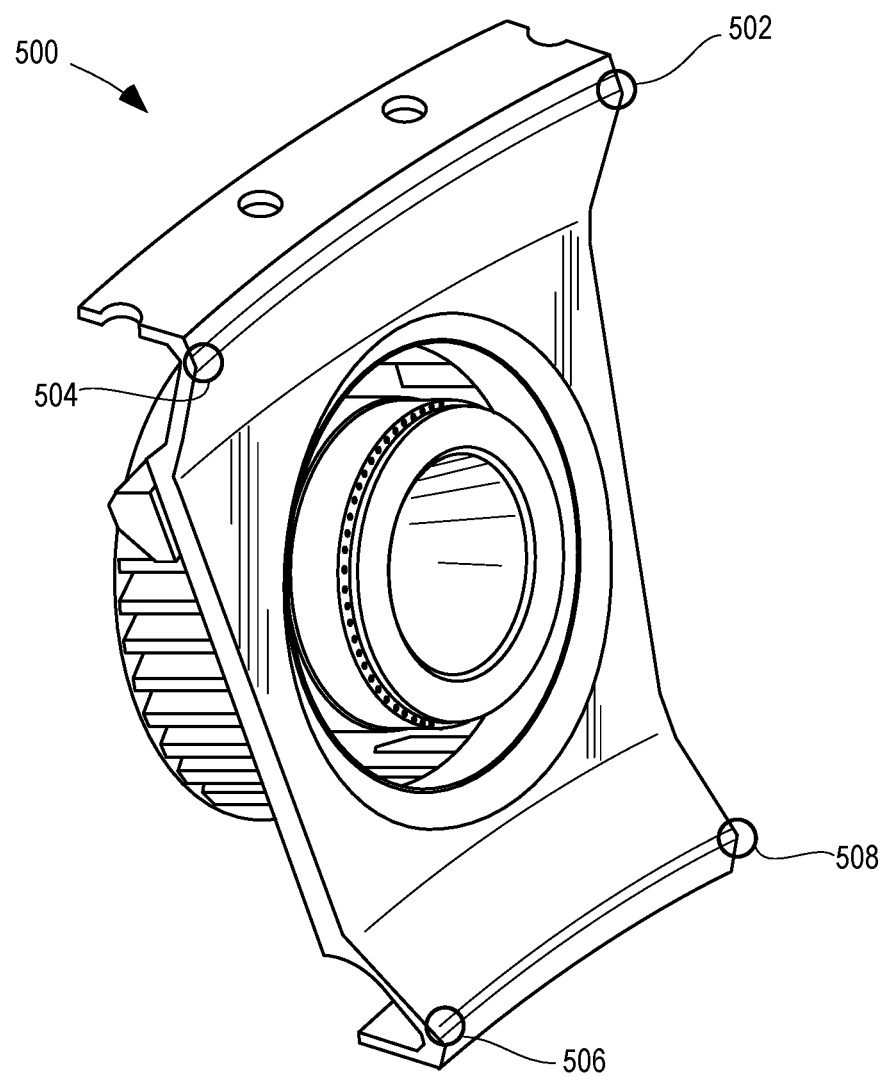
FIG. 5 is an illustration of the localization of a component within the workspace.

FIG. 5 is an illustration of the localization of the tool relative to a component 500 within the workspace. A component 500 is shown with a first point 502 illustrating a first known location. The tool 210, as described in FIG. 2, locates and identifies the first point 502. The tool 210 aligns the intersection 226 with the first point 502. Once aligned, the system and/or the tool 210 determines a tool path or ray between the tool 210 and the first point 502. The tool may target a second point 504 and repeats the alignment process and determines a second tool path between the actual location of the tool 210 and the second point 504. This is repeated for a third point 506 and a fourth point 508, and may be repeated for n known points, where n is greater than or equal to 3.

Once the tool has aligned with each point and determined a tool path relative to the corresponding known points, the system utilizes an iterative approach of comparing the known locations of the points, the known location of the target position, and the tool paths. The system creates an n-by-n transform, in the present illustrative embodiment a four-by-four transform. The system minimizes the distance between the tool paths and the known locations of the points. To minimize the distance between the known locations and the tool paths, the system may find the closest location on the individual tool paths to the known coordinates of the corresponding known locations, these points may be projected onto the tool paths. This may be achieved by using singular value decomposition. The system compares the coordinates of the projected points to the coordinates of the known locations and determines if the RMSE between the points is below a pre-set or predefined threshold. If above the threshold, the system may repeat the method. If below the threshold, the system and/or the tool may determine the actual location of the tool relative to the workspace. Once the tool has determined the actual location of the tool relative to the workspace, the tool may move to the known target location. This may allow for six degrees of freedom localization of the tool within the workspace.

Figure 6:
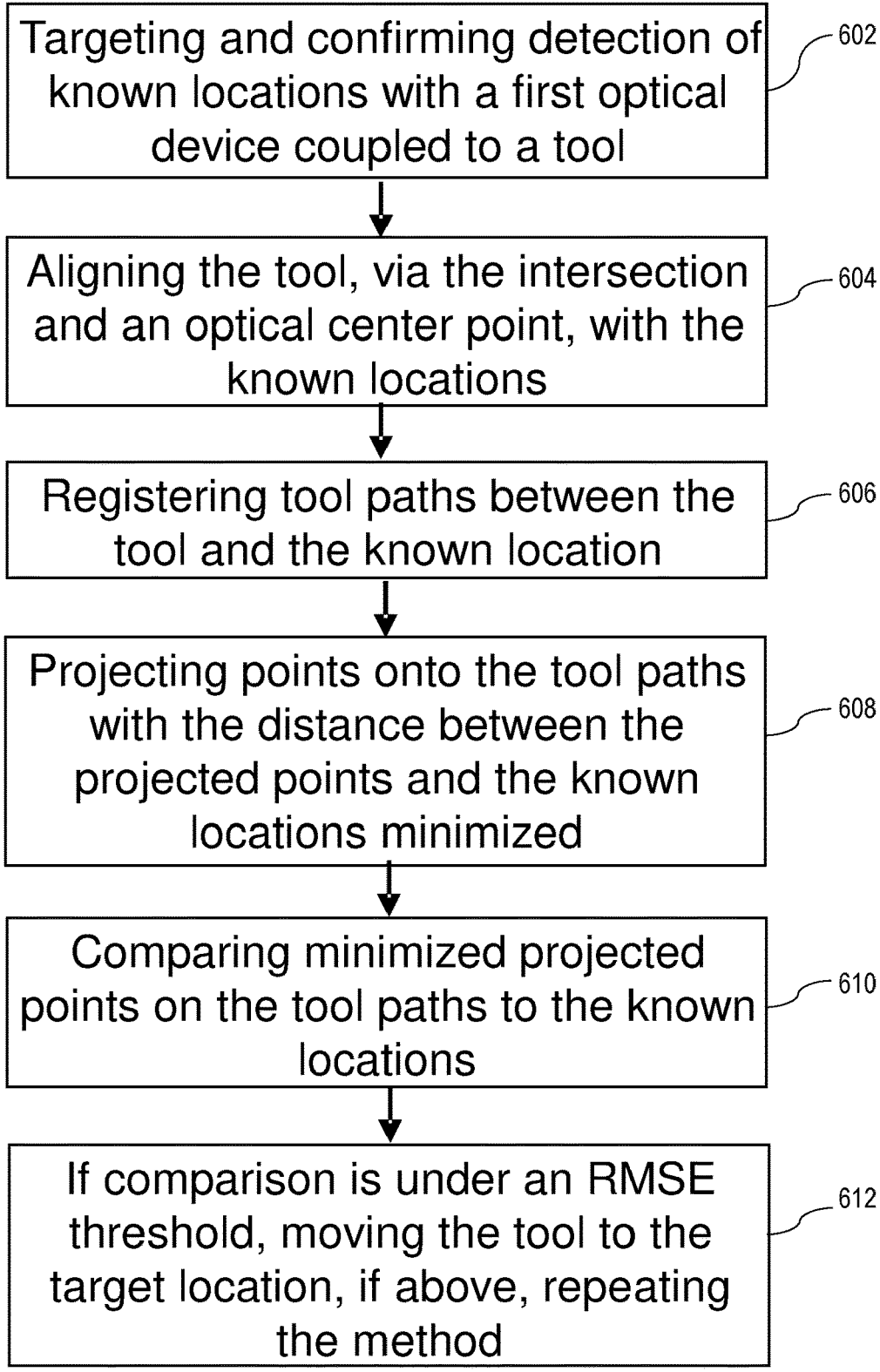
FIG. 6 is a flow diagram of a method of localizing a tool within a workspace.

FIG. 6 illustrates an embodiment of a method 600 for localizing a tool to a location. In step 602, the system and/or the control device targets known locations. The tool targets a first known location with a first optical device coupled to the tool, and using a processor or control device, similar to that described in FIG. 1, confirms detection of the first known location. In step 604 the system aligns the tool with the first known location using the intersection. In step 606, the system registers tool paths to the first location. These above-described steps may be repeated for n known locations where n is greater than or equal to 3. In step 608, the system, using the tool paths and coordinates of the known locations, projects points onto the tool paths that have the minimized distance between the tool paths and known locations. In step 610, the system compares the minimized distance between the projected points and their corresponding coordinates to the coordinates of the known locations. In step 612, the system compares the distance between the projected points and the known locations to determine if the distance is below an RMSE threshold that is pre-set or pre-defined. If the distance is below the threshold, the system determines its actual location and moves the tool to a final target position. If the distance is above the threshold, the system repeats the method 600 as an iterative process until the distance between the projected points and known locations is below the RMSE threshold.

Further aspects of the disclosure are provided by the subject matter of the following clauses:

A tool for performing an operation in a workspace, the tool comprising: a camera configured to generate an image of a field of view of the camera; a first viewing plane defined in the image; and a second optical device located adjacent to the camera, the second optical device configured to define a second viewing plane in the image; wherein the first viewing plane and the second viewing plane intersect to define an intersection point on the image.

The tool of any preceding clause, wherein the second optical device projects a visible line corresponding to the second viewing plane.

The tool of any preceding clause, wherein the second optical device is a laser that projects the visible line in the field of view of the camera.

The tool of any preceding clause, wherein the second viewing plane is defined by the second optical device and the second viewing plane is superimposed over the image of field of view.

The tool of any preceding clause, wherein the first viewing plane and the second viewing plane intersect to define an axis and the intersection point is on the axis.

The tool of any preceding clause, wherein at least one processor coupled to the tool detects the intersection point in the image.

The tool of any preceding clause, further comprising a control device that controls the orientation of the tool to align the intersection point with a desired location.

The tool of any preceding clause, wherein the tool includes a spray nozzle and the axis defines an axis of the spray nozzle.

The tool of any preceding clause, further comprising a calibration device that is configured to be removably coupled to the tool so as to be in the field of view of the camera.

The tool of any preceding clause, wherein the calibration device is configured to be received in the spray nozzle.

The tool of any preceding clause, wherein the calibration device includes markings that define at least two points in the field of view of the camera.

The tool of any preceding clause, wherein the tool includes a proximal body, a distal body, and a wrist connecting proximal body and distal body.

The tool of any preceding clause, wherein the wrist includes at least two rotating actuators and the tool is configured to determine the angles of the at least two rotating actuators.

The tool of any preceding clause, wherein the at least two rotating actuators are configured to align the distal body with known points on a component while the proximal body remains stationary.

The tool of any preceding clause, wherein the tool is configured to determine a current position of the tool based on angles of the at least two rotating actuators and a plurality of known locations on a component, where the angles of the at least two rotating actuators are determined each when the distal body is aligned with each of the plurality of the known locations. The tool of any preceding clause, wherein the tool is configured to move to a desired position after determining the current position.

An alignment system comprising: a control device communicatively coupled to a tool; the tool comprising: at least one processor communicatively coupled to the control device; a first optical device having a field of view and a first viewing plane; and a second optical device located adjacent to the first optical device, the second optical device having a second viewing plane; wherein the alignment system determines a location of an intersection of the first viewing plane and the second viewing plane within a workspace, wherein the at least one processor communicates the location of the intersection in an image proximate to a known point on a component to the control device over a communication network, and wherein the control device adjusts a position of the tool such that the intersection aligns with a desired location.

The alignment system of any preceding clause, wherein the control device and the at least one processor communicate wirelessly over the communication network.

The alignment system of any preceding clause, wherein at least one of the control device and the at least one processor communicate over the communication network via a wired connection.

The alignment system of any preceding clause, wherein the control device is remote from the tool.

The alignment system of any preceding clause, wherein the at least one processor communicates wirelessly over the communication network with at least one of the first optical device and the second optical device.

The alignment system of any preceding clause, wherein the at least one processor communicates with at least one of the first optical device and the second optical device over the communication network via a wired connection.

The alignment system of any preceding clause, further comprising a removable plane calibration device coupled to the tool and usable as a surface for projection of the first viewing plane and the second viewing plane.

The alignment system of any preceding clause, further comprising a display to display the field of view and at least one of the first viewing plane and the second viewing plane.

The alignment system of any preceding clause, wherein the intersection of the first viewing plane and the second viewing plane occurs at any point along the first viewing plane within the field of view.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the disclosed concept.

What is claimed is:

1. A tool for performing an operation in a workspace, the tool comprising:
    a camera configured to generate an image of a field of view of the camera;
    a second optical device located adjacent to the camera, the second optical device configured to project a second viewing plane in the image;
    a processor coupled to the tool and configured to communicate with the camera and the second optical device;
    a spray nozzle at an end of the tool; and
    a paddle configured to be removably coupled to the end of the tool via the spray nozzle and disposed in the field of view of the camera;
    wherein the processor is configured to define a first viewing plane as a centerline of the field of view,
    wherein the processor is configured to rotate the paddle perpendicular to the second viewing plane and define the second viewing plane using two alignment features on the paddle,
    wherein the first viewing plane and the second viewing plane intersect to define an intersection point on the image.

2. The tool of claim 1, wherein the second optical device projects a visible line corresponding to the second viewing plane.

3. The tool of claim 2, wherein the second optical device is a laser that projects the visible line into the field of view of the camera.

4. The tool of claim 1, wherein the second viewing plane is defined by the second optical device and the second viewing plane is superimposed over the image of field of view.

5. The tool of claim 1, wherein the first viewing plane and the second viewing plane intersect to define an axis and the intersection point is on the axis.

6. The tool of claim 1, wherein the processor is configured to detect the intersection point in the image.

7. The tool of claim 6, further comprising a control device that controls an orientation of the tool to align the intersection point with a desired location.

8. The tool of claim 1, wherein the paddle is configured to be received in the end of the spray nozzle.

9. The tool of claim 8, wherein the paddle includes markings that define at least two points in the field of view of the camera.

10. The tool of claim 1, wherein the tool includes a proximal body, a distal body, and a wrist connecting proximal body and distal body.

11. The tool of claim 10, wherein the wrist includes at least two rotating actuators and the tool is configured to determine angles of the at least two rotating actuators.

12. The tool of claim 11, wherein the at least two rotating actuators are configured to align the distal body with known points on a component while the proximal body remains stationary.

13. The tool of claim 12, wherein the tool is configured to determine a current position of the tool based on angles of the at least two rotating actuators and a plurality of known locations on a component, where the angles of the at least two rotating actuators are determined each when the distal body is aligned with each of the plurality of known locations.

14. The tool of claim 13, wherein the tool is configured to move to a desired position after determining the current position.

15. An alignment system comprising:
a control device communicatively coupled to a tool;
the tool comprising:
   at least one processor communicatively coupled to the control device;
   a first optical device having a field of view and a first viewing plane, wherein the at least one processor is configured to define a first viewing plane as a centerline of the field of view;
   a second optical device located adjacent to the first optical device, the second optical device having a second viewing plane; and
a paddle coupled to an end of the tool and usable as a surface for projection of the first viewing plane and the second viewing plane;

wherein the at least one processor is configured to rotate the paddle perpendicular to the second viewing plane and define the second viewing plane using at least two alignment features on the paddle,
wherein the alignment system determines a location of an intersection of the first viewing plane and the second viewing plane within a workspace,
wherein the at least one processor communicates the location of the intersection in an image proximate to a known point on a component to the control device over a communication network, and
wherein the control device adjusts a position of the tool such that the intersection aligns with a desired location.

16. The alignment system of claim 15, wherein the control device and the at least one processor communicate wirelessly over the communication network.

17. The alignment system of claim 15, further comprising a display to display the field of view and at least one of the first viewing plane and the second viewing plane.

18. The alignment system of claim 15, wherein the paddle includes alignment features disposed on the surface.

* * * * *

UNITED STATES PATENT AND TRADEMARK OFFICE
CERTIFICATE OF CORRECTION

| | | |
|---|---|---|
| PATENT NO. | : 12,447,625 B2 | Page 1 of 1 |
| APPLICATION NO. | : 17/832248 | |
| DATED | : October 21, 2025 | |
| INVENTOR(S) | : Todd William Danko et al. | |

It is certified that error appears in the above-identified patent and that said Letters Patent is hereby corrected as shown below:

On the Title Page

Item (57), under "ABSTRACT", in Column 2, Line 12, delete "alignment" and insert -- align --, therefor.

Signed and Sealed this
Twenty-seventh Day of January, 2026

John A. Squires
*Director of the United States Patent and Trademark Office*